US011568862B2

(12) United States Patent
Chen et al.

(10) Patent No.: US 11,568,862 B2
(45) Date of Patent: Jan. 31, 2023

(54) NATURAL LANGUAGE UNDERSTANDING MODEL WITH CONTEXT RESOLVER

(71) Applicant: Cisco Technology, Inc., San Jose, CA (US)

(72) Inventors: Eric Yi-Hua Chen, Irvine, CA (US); Keith Griffin, Oranmore (IE)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/036,864

(22) Filed: Sep. 29, 2020

(65) Prior Publication Data

US 2022/0101834 A1 Mar. 31, 2022

(51) Int. Cl.
*G10L 15/183* (2013.01)
*G10L 15/06* (2013.01)
*G10L 15/18* (2013.01)

(52) U.S. Cl.
CPC .......... *G10L 15/183* (2013.01); *G10L 15/063* (2013.01); *G10L 15/1822* (2013.01); *G10L 2015/0631* (2013.01)

(58) Field of Classification Search
CPC ............................. G06F 16/285; G10L 15/183
See application file for complete search history.

(56) References Cited

U.S. PATENT DOCUMENTS

| 9,918,351 | B2* | 3/2018 | Kim ..................... H04W 4/60 |
| 10,643,035 | B2 | 5/2020 | Kim et al. |
| 10,970,948 | B2* | 4/2021 | Gideon, III ........... H04L 63/107 |
| 11,043,205 | B1* | 6/2021 | Su ......................... G10L 15/183 |
| 11,081,104 | B1* | 8/2021 | Su ......................... G06F 40/216 |
| 11,132,509 | B1* | 9/2021 | Pasko ................... G06K 9/6267 |
| 2002/0065944 | A1* | 5/2002 | Hickey ............. H04M 1/72445 |
| | | | 719/310 |
| 2010/0185509 | A1* | 7/2010 | Higgins ................ G06F 16/951 |
| | | | 705/14.49 |

(Continued)

OTHER PUBLICATIONS

Amazon.com, Inc., "What is Alexa", https://developer.amazon.com/en-US/alexa, downloaded Sep. 28, 2020, 3 pages.

(Continued)

*Primary Examiner* — Jakieda R Jackson
(74) *Attorney, Agent, or Firm* — Edell, Shapiro & Finnan, LLC

(57) ABSTRACT

A system and method for training a virtual assistant to recognize and learn new context for known terms is presented. The method includes receiving a natural language input, corresponding to at least one of a desired intent and a desired entity, at a natural language processor. The method involves scoring known intents based on the natural language input to generate an intent confidence score for each known intent, and scoring known entities based on the natural language input to generate an entity confidence score for each known entity. The method involves comparing the intent confidence scores and entity confidence scores to a threshold value, and determining that the natural language input does not correspond to at least one of the known intents and the known entities based on the comparing. Finally, at least one of a new intent and a new entity are determined based on the natural language input.

20 Claims, 5 Drawing Sheets

(56) References Cited

U.S. PATENT DOCUMENTS

| | | | | |
|---|---|---|---|---|
| 2012/0036137 | A1* | 2/2012 | Naidu | G06F 16/3326 |
| | | | | 707/E17.084 |
| 2012/0232886 | A1* | 9/2012 | Capuozzo | H04L 12/2818 |
| | | | | 704/9 |
| 2013/0091139 | A1* | 4/2013 | Raj | G06F 40/30 |
| | | | | 707/740 |
| 2014/0280360 | A1* | 9/2014 | Webber | G06F 16/28 |
| | | | | 707/798 |
| 2015/0066479 | A1* | 3/2015 | Pasupalak | G06F 16/90332 |
| | | | | 704/9 |
| 2015/0073798 | A1* | 3/2015 | Karov | G06F 40/289 |
| | | | | 704/245 |
| 2015/0154246 | A1* | 6/2015 | Allen | G06F 16/3344 |
| | | | | 707/758 |
| 2016/0098393 | A1* | 4/2016 | Hebert | G06F 16/3344 |
| | | | | 704/9 |
| 2016/0224652 | A1* | 8/2016 | Schwartz | G06K 9/6218 |
| 2016/0342906 | A1* | 11/2016 | Shaashua | H04L 67/12 |
| 2017/0154356 | A1* | 6/2017 | Trevisiol | G06Q 30/0272 |
| 2017/0235817 | A1* | 8/2017 | Deodhar | G06F 16/24578 |
| | | | | 707/736 |
| 2017/0245125 | A1* | 8/2017 | Child | H04W 4/12 |
| 2018/0018966 | A1* | 1/2018 | Leonard | G06Q 10/10 |
| 2018/0053114 | A1* | 2/2018 | Adjaoute | G06N 3/126 |
| 2018/0190264 | A1* | 7/2018 | Mixter | G10L 15/22 |
| 2018/0190285 | A1* | 7/2018 | Heckmann | G06F 1/20 |
| 2018/0191746 | A1* | 7/2018 | De Knijf | H04L 43/0876 |
| 2018/0234326 | A1* | 8/2018 | Swierk | H04L 67/303 |
| 2018/0261216 | A1* | 9/2018 | Leeb | G10L 15/1815 |
| 2018/0307678 | A1* | 10/2018 | Anantaram | G10L 15/22 |
| 2019/0074006 | A1* | 3/2019 | Kumar | G10L 15/1815 |
| 2019/0189126 | A1 | 6/2019 | Liu et al. | |
| 2019/0266237 | A1 | 8/2019 | Ray et al. | |
| 2020/0035229 | A1* | 1/2020 | Solanki | G10L 15/1822 |
| 2020/0042649 | A1* | 2/2020 | Bakis | G06N 20/00 |
| 2020/0126551 | A1* | 4/2020 | Xiong | G06F 3/167 |
| 2020/0137230 | A1 | 4/2020 | Spohrer | |
| 2020/0184278 | A1* | 6/2020 | Zadeh | G06F 16/953 |
| 2020/0387529 | A1* | 12/2020 | Jagadish | G06Q 10/105 |
| 2020/0387531 | A1* | 12/2020 | Agnihotram | G06F 16/3344 |
| 2020/0410450 | A1* | 12/2020 | Malhotra | G06F 40/284 |
| 2021/0004391 | A1* | 1/2021 | Ferreira, Jr. | G06F 16/285 |
| 2021/0004537 | A1* | 1/2021 | Sapugay | G06F 16/3329 |
| 2021/0064826 | A1* | 3/2021 | Rajagopal | G06N 7/005 |
| 2021/0081831 | A1* | 3/2021 | Angel | G06N 7/005 |
| 2021/0097110 | A1* | 4/2021 | Asthana | H04L 51/02 |

OTHER PUBLICATIONS

Microsoft, "Cortama", https://www.microsoft.com/en-us/cortana, downloaded Sep. 28, 2020, 3 pages.

Google, "Google Assistant, your own personal Google", https://assistant.google.com/, downloaded Sep. 28, 2020, 5 pages.

Apple Inc., "Siri", https://www.apple.com/siri/, downloaded Sep. 28, 2020, 21 pages.

* cited by examiner

NATURAL LANGUAGE UNDERSTANDING MODEL WITH CONTEXT RESOLVER

TECHNICAL FIELD

The present disclosure relates to machine natural language understanding (NLU) model, and in particular, an NLU model that can resolve contextual conflicts.

BACKGROUND

Voice activated virtual assistants have become popular. Typically, a virtual assistant can perform a variety of operations based on specific speech commands. That is, the virtual assistant is pre-programmed with specific commands for intents that correspond to certain actions related to certain entities. If a user provides a speech command other than the pre-programmed commands, the virtual assistant may not understand the intent of a user and request clarification. Moreover, in some situations, the virtual assistant may understand an intent of the user, but the subject, or entity, to which the intent relates may not be understood. Accordingly, the virtual assistant may request clarification and/or may not carry out the desired intent with the determined entity.

DESCRIPTION OF EXAMPLE EMBODIMENTS

Overview

Figure 1:
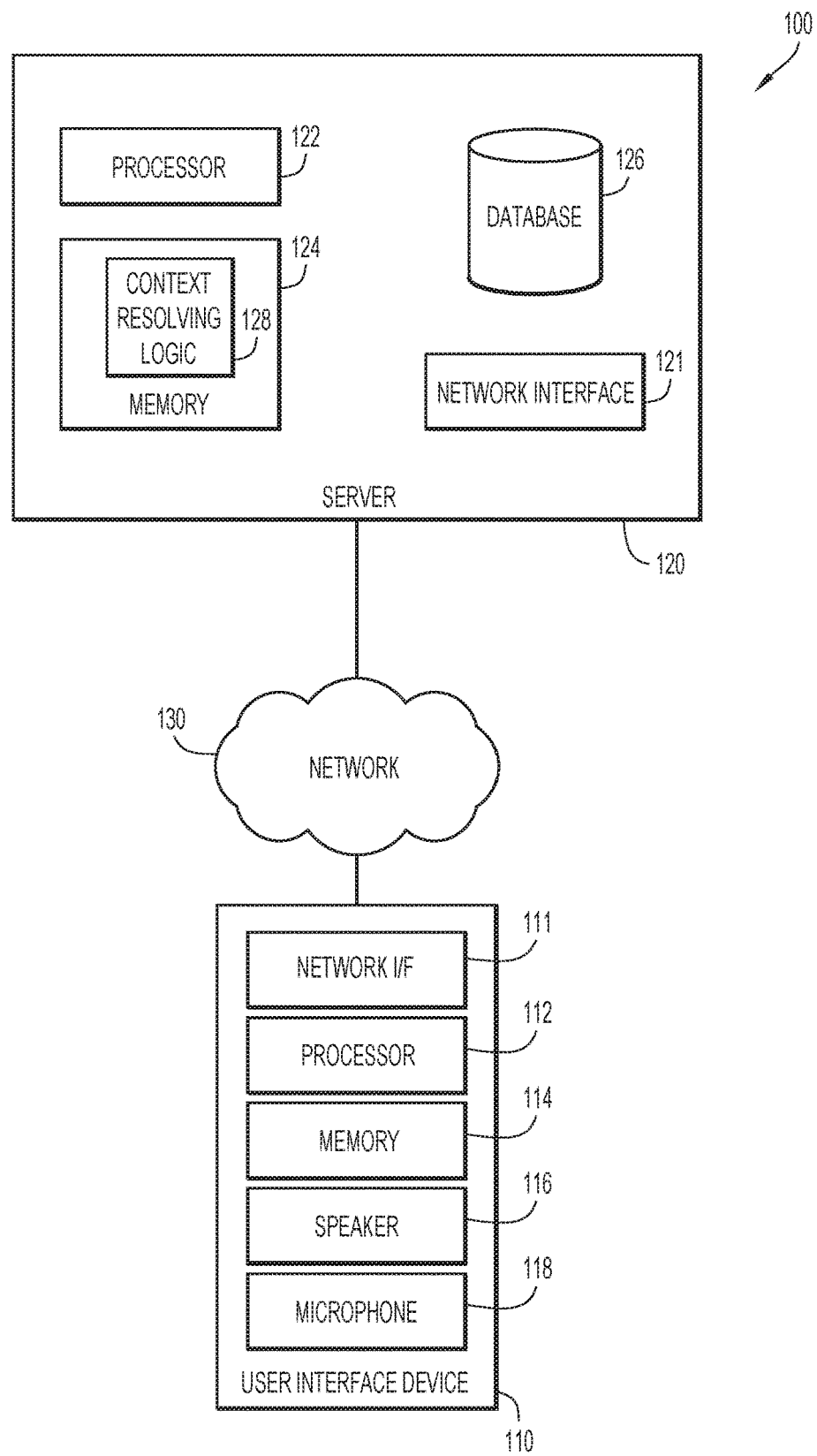
FIG. 1 is a diagram of a system for a natural language understanding model with a context resolver, according to an example embodiment.

A system and method for training a virtual assistant to recognize and learn a new context for known terms is presented. The method includes receiving a natural language input at a natural language processor. The natural language input corresponds to at least one of a desired intent and a desired entity. The method involves scoring, via the natural language processor, known intents based on the natural language input to generate an intent confidence score for each known intent. The method further involves scoring, via the natural language processor, known entities based on the natural language input to generate an entity confidence score for each known entity. The method includes comparing, via the natural language processor, the intent confidence scores and entity confidence scores to a threshold value, and determining that the natural language input does not correspond to at least one of the known intents and the known entities based on the comparing. Finally, the method includes determining at least one of a new intent and a new entity based on the natural language input.

Example Embodiments

As virtual assistants incorporate new abilities to perform more operations with new entities, a natural language understanding (NLU) model that can continually learn new intents and/or entities is desirable. The new intent and/or entity may use the same or substantially similar term as a known intent or entity, but with different context. The NLU model resolves conflicts between the definitions of the known intents or known entities and a newly defined intent and/or entity.

Typically, virtual assistants operate in response to a set of predetermined commands associated with known entities. For example, intents may include searching a database for information about an entity, sending an email or text message to a person or group of people, scheduling a meeting on a calendar regarding a desired subject, inviting a person or group of people to a meeting or call, calling or texting a person, turning on or activating a device, and/or other operations that may be performed via a device, e.g., a computer, a smartphone, a vehicle, a robot, etc. Entity and intent recognition is an important part of machine learning. The recognition provides context for the terms from a user's speech. The virtual assistant uses the recognized entity and intent to determine a confidence level of the recognition. In response to determining a low confidence level for an entity or intent, the virtual assistant may determine that at least one of the recognized entity and intent are being used out of context. That is, the user may have another desired intent or is referring to a different entity than the recognized entity, even though the same terms are being used. For example, the user may refer to a known term that has a first meaning to the virtual assistant, but that has a second meaning known to the user. The virtual assistant will then perform a training operation to relearn a possible secondary definition for the terms provided by the user. For example, the virtual assistant may scan one or more databases for previous uses of the terms by the user, or other users, to determine the second meaning and/or defining a new intent and/or new entity.

With reference to FIG. 1, a description is provided of an exemplary embodiment of a system 100 for providing a virtual assistant. The system 100 is illustrated as including a user interface device 110 and a server 120. The user interface device 110 and the server 120 may be directly connected or may be connected via a network 130. The user interface device 110 includes a network interface 111, a processor 112, memory 114, a speaker 116, and a microphone 118. While the user interface device 110 includes speaker 116, embodiments are not limited thereto. In some implementations, the user interface device 110 may include a display (e.g., liquid-crystal display ("LCD"), or light-emitting diode screens, and the like, with touch-screen input capability) for providing information to a user. In some implementations, the user interface device 110 may further include a manual input device (e.g., mouse, joystick, keypad, keyboard, etc.) for receiving inputs from a user. In some implementations the user interface device 110 may be a computing device, an Internet of Things ("IoT") device, a vehicle, a workstation, a mobile device, a smart phone, a tablet, and/or a virtual assistant device. The user interface device 110 may provide a user with access to a network, memory, and/or software/apps/applications running on the user interface device 110, software running on a server in the cloud, etc.

The server 120 includes network interface 121, a processor 122, a memory 124, and a database 126. While database 126 is shown as being part of server 120, embodiments are not limited thereto. In some implementations, the database 126 may be separate from the server 120 and the server 120 may communicate with the database 126 via the network 130 and/or user interface device 110. While one server 120 is shown in FIG. 1, embodiments are not limited thereto. The system 100 may include more than one instance of server 120. The memory 124 stores software instructions for NLU with Context Resolving logic 128. The NLU with Context Resolving logic 128 enables the server 120 to perform the operations described herein.

The network 130 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Network 130 is capable of transmitting data. The network 130 can also comprise base stations, controller nodes, telephony switches, internet routers, network gateways, computer systems, communication links, or some other type of communication equipment, and combinations thereof. In some implementations, the user interface device 110 may be configured to access and communicate with the server 120 via the network 130. In some implementations, the user interface device 110 may communicate with one or more elements, servers, and/or devices connected to the network 130.

In operation, the user interface device 110 receives voice speech (audio) from a user. For example, the microphone 118 of user interface device 110 may receive audio corresponding to a user's speech. The user interface device 110 converts the audio to digital audio data representing the audio captured by the microphone 118, and may transmit the digital audio data to the processor 122 of the server 120 to determine an intent and entity from a command corresponding to the user's speech. In some implementations, the processor 112 of the user interface device 110 may perform the operations of the processor 122 (and NLU with Context Resolving logic 128) of the server 120 to determine the intent and entity from the command corresponding to the user's speech. In response to determining the intent and entity, the user interface device 110 carries out the determined intent of the user. Additionally, or alternatively, the processor 112 or processor 122 may determine one or more terms are being used out of context in response to low confidence scores for known intents and/or known entities.

Figure 2:
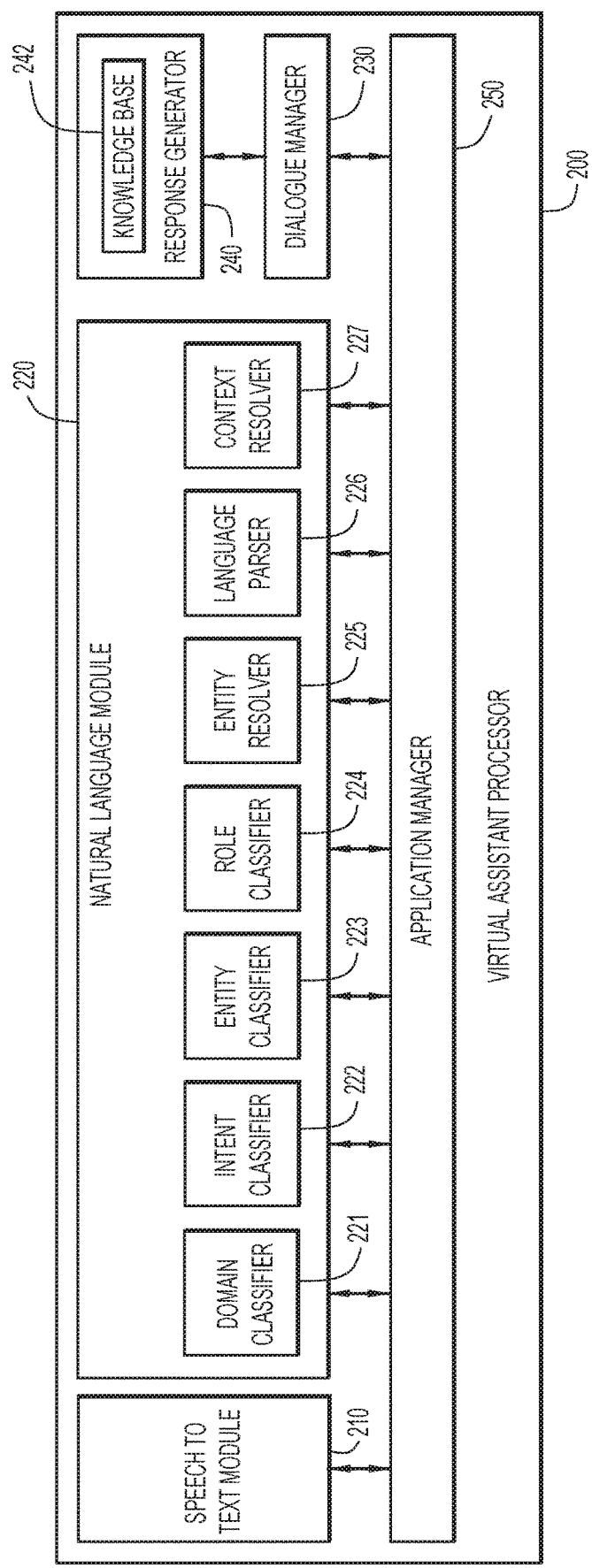
FIG. 2 is a diagram of a voice assistant processor configured to perform context resolving operations, according to an example embodiment.

Reference is now made to FIG. 2. FIG. 2 illustrates a voice assistant processor ("VAP") 200. The VAP 200 may be representative of processor 112 of the user interface device 110 and/or processor 122 of the server 120; however, embodiments are not limited thereto. The VAP 200 includes a speech-to-text ("STT") module 210 a natural language understanding ("NLU") module 220, a dialogue manager 230, a response generator 240, and an application manager 250. The NLU module 220 includes a domain classifier 221, an intent classifier 222, an entity recognizer 223, a role classifier 224, an entity resolver 225, a language parser 226, and a context resolver 227. The dialogue manager 230 may include a text-to-speech ("TTS") module (not shown) for converting text into an audio signal. The response generator 240 includes a knowledge base 242. The STT module 210, NLU module 220 and TTS module of the dialogue manager 230 may be implemented using any known modules, e.g., Kaldi for STT, MindMeld for NLU, and MaryTTS, Mimic and/or Voice Builder for TTS.

The VAP 200 may be trained to determine relationships between certain intents and entity types, and generate instructions to execute or perform specific operations corresponding to the determined intents and entities, e.g., arranging travel, scheduling meetings, shopping, approving expenses, finding and distributing content, assigning action items etc. The VAP 200 may be trained via supervised or unsupervised machine learning techniques. For example, the VAP 200 may be trained using any now known or hereinafter developed training techniques. The training may generate the knowledge base 242.

The knowledge base 242 may be a comprehensive repository of information for understanding requests and answering questions. The knowledge base 242 may be indexed, or structured, based on intent and application specific concepts to reflect relationships between information to understand intents and carry out corresponding operations. The knowledge base may be generated based on training of the VAP 200 with data mined from one or more of a contact list, a company directory, social media network, building directory, past meeting minutes, meeting transcripts, phone call history, phone call transcripts, emails, text messages, content (e.g., videos, movies, music, books, etc.) catalogs, directory of area businesses, etc. The knowledge base 242 may continuously or periodically update in response to user interactions with the VAP 200. The knowledge base 242 is shown as being stored on one or more non-transitory computer readable storage media locally coupled to the VAP 200. Additionally, or alternatively, the knowledge base 242 may be stored remotely in the cloud, e.g., memory 124 of server 120 and/or database 126 of FIG. 1, to which the VAP 200 has access. The components of the VAP 200 may compare text inputs to the knowledge base 242 to determine and carry out an intent with an entity.

The STT module 210 is configured to convert a received digital audio data (derived from captured audio corresponding to a user's speech) to text. For example, a user may ask a virtual assistant implemented by the VAP 200 to arrange a meeting with a coworker at a desired date and time using terms known to the VAP 200 through previous training of the knowledge base 242.

The NLU module 220 is configured to determine a domain from the text (generated by the STT module 210) by the domain classifier 221, and determine an intent within the domain. For example, the domain classifier 221 compares the text to pre-defined domains and generates a confidence score for each domain based on the comparing. Each pre-defined domain includes one or more pre-defined intents. The domain classifier 221 ranks the pre-defined domains based on the confidence scores. The highest ranking domain is selected as the determined domain.

The intent classifier 222 determines a pre-defined intent from the selected or determined domain. The classifier compares the text to one or more pre-defined, or known, intents corresponding to the selected/determined domain and generates a confidence score for each intent based on the comparing. The intent classifier 222 ranks the pre-defined intents based on the confidence scores. The highest ranking intent is selected as the determined intent.

The entity recognizer 223 recognizes terms of the text as referring to one or more types of entities (e.g., a person, a place, time, and/or a thing) based on the selected/determined intent. That is, each pre-defined intent typically has one or more corresponding entity types. The entity recognizer 223 compares the converted text to one or more entity types corresponding to the determined intent. The entity recognizer 223 assigns entity types to certain terms based on the comparison made to one or more entity types based on the determined intent.

The role classifier 224 determines a role of a recognized entity. For example, if two terms are labeled with the same entity type, the role classifier 224 determines the roles of those two entities. For example, if two times are recognized from the text converted from a user's speech, the role classifier 224 may determine that one instance of the times is a start time and the other instance is an end time. Further, if two locations are recognized, the role classifier 224 may determine one of the locations is a departure location, and the other location entity is a destination location.

The entity resolver 225 determines one or more real world entities corresponding to the one or more recognized entities. For example, the entity resolver 225 compares the recognized entities to the knowledge base 242 to determine the real-world entity from the text of the user's speech. Based on the comparison, the entity resolver 225 may generate confidence scores for real-world entities from the knowledge base 242. The entity resolver 225 ranks the real-world entities based on the generated confidence scores, and selects a highest ranking real-world entity as a determined, or identified, entity.

The language parser 226 determines relationships between the individual entities identified by the entity resolver 225 and groups the entities into a meaningful hierarchy, e.g., a parse tree providing relationships between different identified entities.

The response generator 240 generates a set of instructions, to be executed by a processor, for performing the determined intent from the user's speech based on the knowledge base 242. For example, the response generator 240 generates instructions corresponding to the determined intent and real-world entities from the knowledge base 242. The response generator 240 may further generate a response to a user to be output via a speaker or display of the user interface device 110.

The dialogue manager 230 is configured to convert text into digital audio that can be converted to an audio signal that may be understood by a user (e.g., a human) as speech. That is, the dialogue manager 230 generates digital audio that, when converted to an audio signal that is output by a speaker (e.g., speaker 116 of user interface device 110 in FIG. 1), may be audible by a user. In some implementations the dialogue manager 230 tracks the context of a conversation across multiple interactions with one or more users. Responses to user requests may be generated by the dialogue manager based on the previous interactions, such as follow-up questions/answers in response to a user's speech.

The application manager 250 is configured to manage and transmit information between the STT module 210, NLU module 220, domain classifier 221, intent classifier 222, entity recognizer 223, role classifier 224, entity resolver 225, language parser 226, context resolver 227, dialogue manager 230, and response generator 240.

Figure 3:
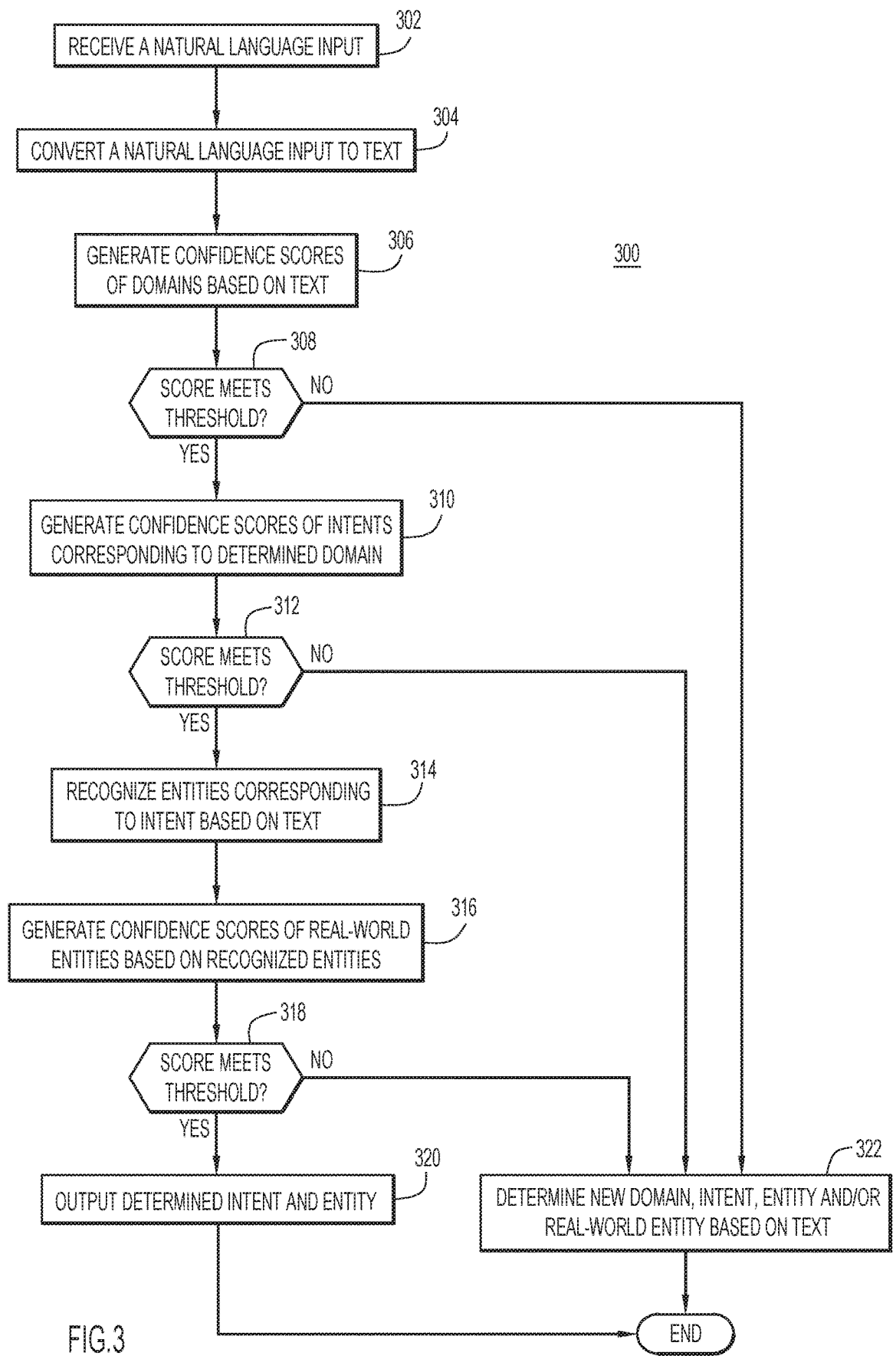
FIG. 3 is a flow chart illustrating a method of natural language understanding with context resolving, according to an example embodiment.

FIG. 3 is a flow chart illustrating a method 300 for natural language understanding processing with context resolving, according to an embodiment. The method 300 may be implemented by VAP 200 shown in FIG. 2. Reference is made to FIGS. 1 and 2 for purposes of the description of FIG. 3.

In operation 302, a natural language input, e.g., a user's speech command, is received. For example, a user may say "schedule a meeting with Jan from accounting from 11 am to noon in oak." The user's speech (audio) may be captured by microphone 118 of user interface device 110 and converted into a digital signal. In operation 304, the natural language input is converted into text. For example, the speech-to-text module 210 converts the digital signal corresponding to the user's speech into text.

In operation 306, confidence scores for known domains of the knowledge base 242 are generated based on the text. For example, the domain classifier 221 may compare the terms from the converted text to known domains e.g., meetings, travel, procurement, expenses, device control, information gathering etc. In operation 308, the confidence scores of domains are compared to a threshold. Domains having confidence scores satisfying the threshold are ranked based on their corresponding confidence scores, whereas domains with confidence scores not satisfying the threshold are ignored or discarded. Further to the example provided above, the domain classifier 221 may determine "meetings" as the highest ranked domain based on the converted text. That is, the domain classifier 221 may determine that a domain of the converted text is most likely "meetings." The "meetings" domain may include one or more known intents, e.g., scheduling meetings, take meeting notes, initiating a phone call, start a virtual meeting, etc.

In operation 310, confidence scores of intents corresponding to the highest ranking domain are generated. In operation 312, the confidence scores of intents are compared to a threshold. Intents having confidence scores meeting the threshold are ranked based on their corresponding confidence scores. In the example provided above, the intent classifier 222 may determine the intent of "scheduling a meeting" as having a highest rank among the intents listed in the "meeting" domain. That is, the intent classifier 222 may determine that an intent of the converted text is most likely to "schedule a meeting." The "schedule a meeting" intent may include one or more corresponding known entities, e.g., persons or participants, time, date, location etc.

In operation 314, terms from the text are recognized as entities corresponding to the highest ranked intent. In the example provided above, the entity recognizer 223 determines, or recognizes, based on training and the known intent that "Jan," "accounting," "11 am," "noon," and "oak" as desired entities from the converted text for the intent of "scheduling a meeting." For example, the entity recognizer 223 may determine, based on the syntax of the text and the intent, that "Jan" is a meeting participant and/or person, "accounting" is a department, "11 am" and "noon" are times, and "oak" is a location for the meeting. That is, the entity recognizer 223 labels certain terms from the converted text with entity types based on syntax of the text and the intent to generate one or more recognized entities. In instances where two entities are classified, or assigned, with the same entity type, the role classifier 224 may determine a role of the two similarly classified entities. Here, the role classifier 224 determines, based on training, that the entities "11 am" and "noon" are both classified as "time". Accordingly, the role classifier determines, based on training, that the entity "11 am" is a start time for the meeting, and the entity "noon" is the end time for the meeting.

In operation 316, confidence scores of real-world entities are generated based on the recognized entities. For example, the entity resolver 225 compares the term "Jan" (recognized as a person from the recognized department "accounting") to the knowledge base 242. The knowledge base 242 may include a contact list, or directory comprising contact information of known persons/places/entities (e.g., email, phone number, address, rooms within one or more buildings etc.) Based on the comparing, the entity resolver 225 generates confidence scores of real-world entities from the knowledge base 242 and compares the confidence scores to a threshold in operation 318. Real-world entities with confidence scores meeting the threshold are ranked. The entity resolver 225 selects the highest ranked real-world entity as the determined entity. In the provided example, the entity resolver 225 may determine the entity "Jan" corresponds to a real-world person "Jan Myerson" from the "accounting" department. In some implementations, the entity resolver 225 may also determine a corresponding employee ID from the knowledge base 242. As a further example, the entity resolver 225 compares the term "oak" (recognized as a location) to the knowledge base 242 and ranks real-world location entities stored therein. Based on the ranking, the entity resolver 225 may determine the location entity "oak" corresponds to a real-world conference room in a company building designated as "the oak conference room."

In operation 320, the determined intent and entity is output. In the example provided above, the response generator 240 generates instructions to be executed by a processor for scheduling a meeting between the user and Jan Myerson between 11 am and 12 pm in the oak conference room based on the converted text. The response generator 240 may obtain Jan Myerson contact information and/or calendar information, and any other information necessary for scheduling the meeting from the knowledge base 242. The instructions may be executed via processor 112 or 122 of FIG. 1, or the VAP 200 of FIG. 2. When executed, the instructions may cause the processor to send a meeting request/invite to Jan Myerson and schedule the meeting on the user's calendar. The response generator 240 may further generate a response to be output to the user. In the example provided above, the response may be "your meeting with Jan Myerson has been scheduled for 11 am in the oak conference room."

At instances where one or more of the confidence scores of the known domains, intents, recognized entities, and/or real-world entities fail to meet the threshold (e.g., at operations 308, 312, and/or 318) the method proceeds to operation 322. In operation 322, the domain, intent, recognized entities, and/or real-world entities are determined to be used out of context, or cannot be determined. A new domain, intent, recognized entity, and/or real-world entity is determined. For example, the context resolver 227 may determine a new domain, intent, entity type, and/or real-world entity through unsupervised training in response to indications that an intent and/or real-world entity cannot be determined. For example, indications that an intent and/or a real-world entity cannot be determined include one or more of the domain classifier 221, intent classifier 222, and/or entity resolver 225, returning low confidence scores, e.g., confidence scores below a threshold value, for the domains, intents, recognized entities, and/or real-world entities determined from the user's speech. Another indication may be one or more responses, tracked by the dialogue manager 230, from the user indicating that a determined intent and/or entity are wrong. For example, the dialogue manager 230 may track one more responses from a user cancelling execution of a process initiated by a previously provided speech command and providing a new speech command that is executed.

In the example provided above, the user states "schedule a meeting with Jan from accounting from 11 am to noon in oak." Further to this example, in instances where multiple contacts stored in the knowledge base 242 have similar names and/or departments, the entity resolver 225 may return the following low confidence scores for contacts in the knowledge base 242 corresponding to "Jan from accounting":

| Contact Name | Department | Employee ID Number | Confidence Score (Out of 100) |
|---|---|---|---|
| Jan Myerson | Finance | 82417 | 30 |
| Janet Smith | Accounting | 88249 | 30 |
| Janice Singh | Accounting | 76258 | 30 |

Here, it is unclear from the speech as to whether the user is referring to an unknown nick name, or alias, for "Janet" or "Janice" from "accounting" or if the user misspoke and meant "Jan" from the "finance" department rather than the "accounting" department. Thus, the entity resolver 225 outputs low confidence scores (e.g., scores below 50%) for the real-world entities "Jan Myerson," "Janet Smith," and "Janice Singh." In response to the real-world entities returning with low confidence scores, a signal, (e.g., error message) is sent to the context resolver 227 indicating that the real-world entity corresponding to "Jan" cannot be determined.

Similarly, the location "oak" in the provided example may also appear to be out of context. For example, the knowledge base 242 may associate "oak" with only a type of wood and/or tree. The response generator 240 attempts to schedule the meeting at "oak" by searching the knowledge base 242 for a location corresponding to "oak." Because the knowledge base 242 may associate "oak" with a type of wood or tree and not a location, low confidence scores may be returned. Accordingly, the response generator 240 may output a signal, (e.g., error message) to the context resolver 227 indicating that the real-world location corresponding to "oak" cannot be determined.

In response to receiving an error message from a component of the VAP 200 corresponding to a term from the received speech, the context resolver 227 initiates training of the VAP 200 to determine a new domain, intent, entity type, and/or real-world entity. The context resolver 227 may search data stored in a database (e.g., database 126) for past uses of the terms from the user's speech. The data may include data mined from one or more of a contact list, a company directory, social media network, building directory, past meeting minutes, meeting transcripts, phone call history, phone call transcripts, emails, text messages, content (e.g., videos, movies, music, books, etc.) catalogs, product directory, directory of area businesses, past interactions with the virtual assistant, etc. Based on the training, the context resolver 227 may determine a new domain, intent, entity type, and/or real-world entity.

For example, during the updated training, the context resolver 227 may find past instances in the user's calendar where the user met with a "Janice Singh" from accounting. As a further example, the context resolver 227 may find past instances of the user referring to "Janice Singh" as "Jan" in meeting minutes, text messages, emails, call transcripts, and/or meeting transcripts. Accordingly, the context resolver 227 may associate "Jan" with the real-world person "Janice Singh". The knowledge base 242 may be updated with the "Jan" as a real-world entity "Janice Singh" such that future voice inputs with "Jan" from the user will be associated with "Janice Singh."

The context resolver 227 may also determine a new real-world entity for "oak." During the updated training, the context resolver 227 may find references to a local restaurant, conference room, and a scheduling application referred to as "oak." The context resolver 227 may find multiple instances of meetings being held in the "oak conference room" with participants from the accounting department. Accordingly, the context resolver 227 may associate "oak" with the real-word "oak conference room". The knowledge base 242 may be updated with the "oak" as a real-world location entity "the oak conference room" such that future voice inputs with a location corresponding to "oak" from the user will be associated with "the oak conference room."

While the above examples refer to determining new entities, the method may be applied to intents as well. For example, the context resolver 227 may determine a new intent in response on low confidence scores for intents. The context resolver 227 may initiate updated training to determine a new intent based on text corresponding to a user's command. Additionally, or alternatively, the user may provide a command, and the VAP 200 may output a confirmation of the determined intent based on the user's command. In response to the user's indicating the determined intent is wrong, the context resolver 227 may initiate updated training.

For example, during the updated intent training, the context resolver 227 may find past instances of user interactions with the VAP 200 using similar terms as that of the user's instant command. In the past instances, the user may provide a command using the similar terms, the VAP 200 may output a confirmation of a determined intent, and the user may provide an indication that the intent as wrong and provide another command where the intent is determined, confirmed, and executed by the VAP 200. The context resolver 227 may find a number of such instances and cluster similar instances by known intents. Based on the clustering, the context resolver 227 may determine the desired intent of instant command from the user. For example, the user may state "get me Janice from accounting." In response, the VAP 200 may output contact information for Janice from accounting. The user may then interrupt or cancel the output and state "call Janice from accounting." The VAP 200 may initiate the call with Janice and also initiate a training. During the training, the VAP 200 may search for similar instances where the user stated "get me [a contact] from [a department]" and then followed up with an interruption or canceling of an output, followed by an input of "call [the contact] from [the department]." Based on the training, VAP 200 will learn the intent "get me [a contact]" corresponds to calling the contact.

Figure 4:
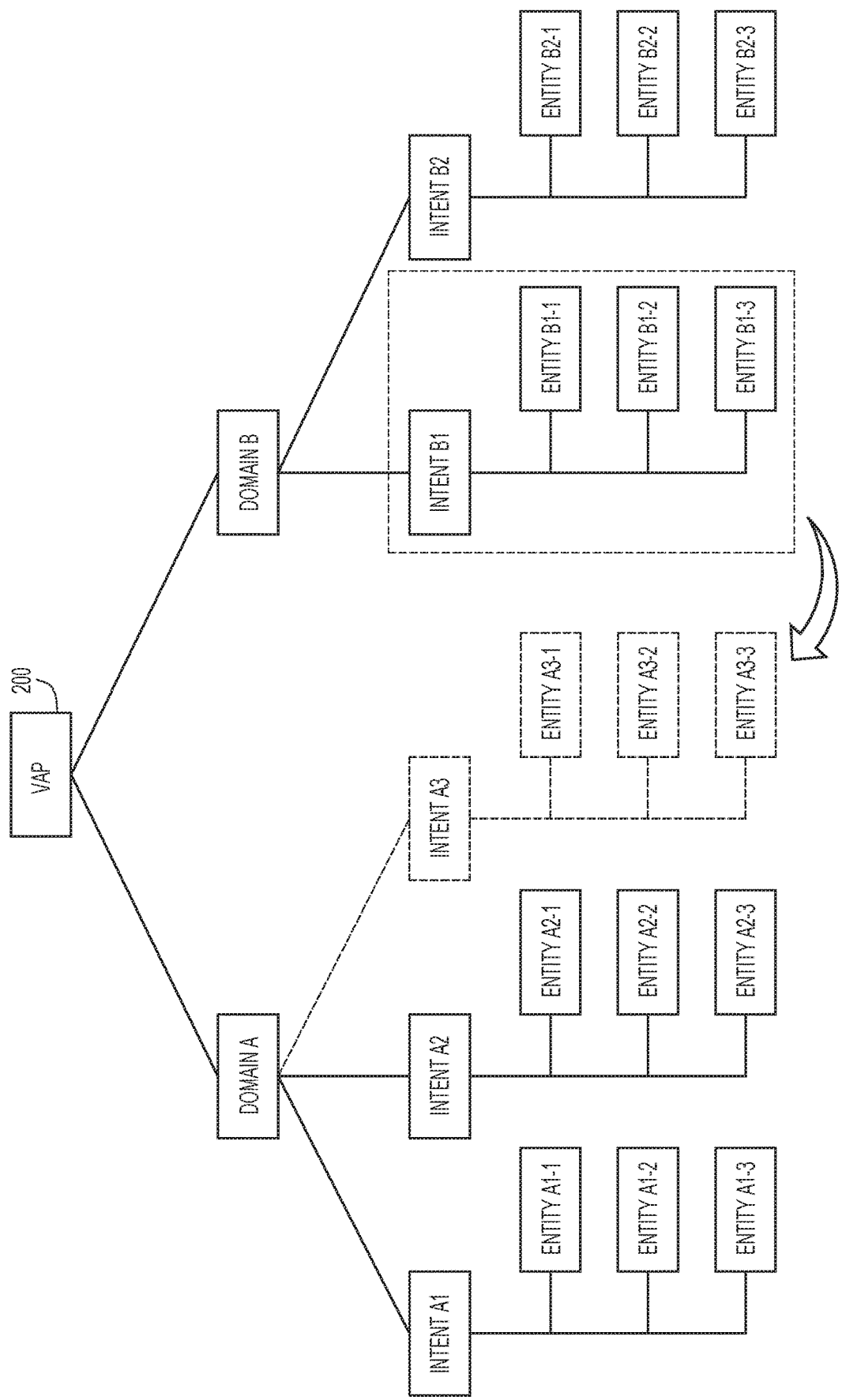
FIG. 4 is a diagram depicting relationships between domains, intents, and entities useful for context resolving, according to an example embodiment.

FIG. 4 illustrates a diagram that depicts the relationships between domains, intents, and entities. Initially, the VAP 200 includes Domain A and Domain B. Domain A includes intents A1 and A2. Domain B includes intents B1 and B2. Each intent may include one or more entities. Intent A1 includes Entities A1-1, A1-2, and A1-3, Intent A2 includes Entity A2-1, A2-2, and A2-3. Intent B1 includes Entities B1-1, B1-2, and B1-3, and Intent B2 includes Entities B2-1, B2-2, and B2-3. For example, Domain A may be an information gathering domain, Intent A1 may be an Internet search, with entities A1-1 through A1-3 being an entity or attributes of an entity to be searched. Intent A2 may be searching for a contact from a company directory. Entities A2-1 through A2-3 may be attributes associated with the contact (e.g., first name, last name, department, identification number, etc.) Domain B may be a communication domain. Intent B1 may be an intent to call a contact, and Intent B2 may be an intent to send an email to a contact. Entities B1-1 through B1-3 and B2-1 through B2-3 may be attributes associated with the contact.

In the "get [a contact]" example provided above, prior to the update intent training, "get me [a contact]" falls under Domain A/Intent A2 which corresponds to searching for contact information within a company directory. After the updated intent training and determining "get me [a contact]" as an intent corresponding to Intent B1 ("call [a contact]"), Intent B1 and the corresponding entities B1-1 through B1-3 are copied into Domain A as Intent A3 having corresponding entities A3-1, A3-2, and A3-3. Thus, when the user states "get [contact]" after the updated training, the VAP 200 will again classify the input under Domain A but with new Intent A3 being determined as the desired intent. Accordingly, the VAP 200 will output instructions to initiate a phone call with the entity associated with entities A3-1 through A3-3 (e.g., first name, last name, department, identification number, etc.).

Figure 5:
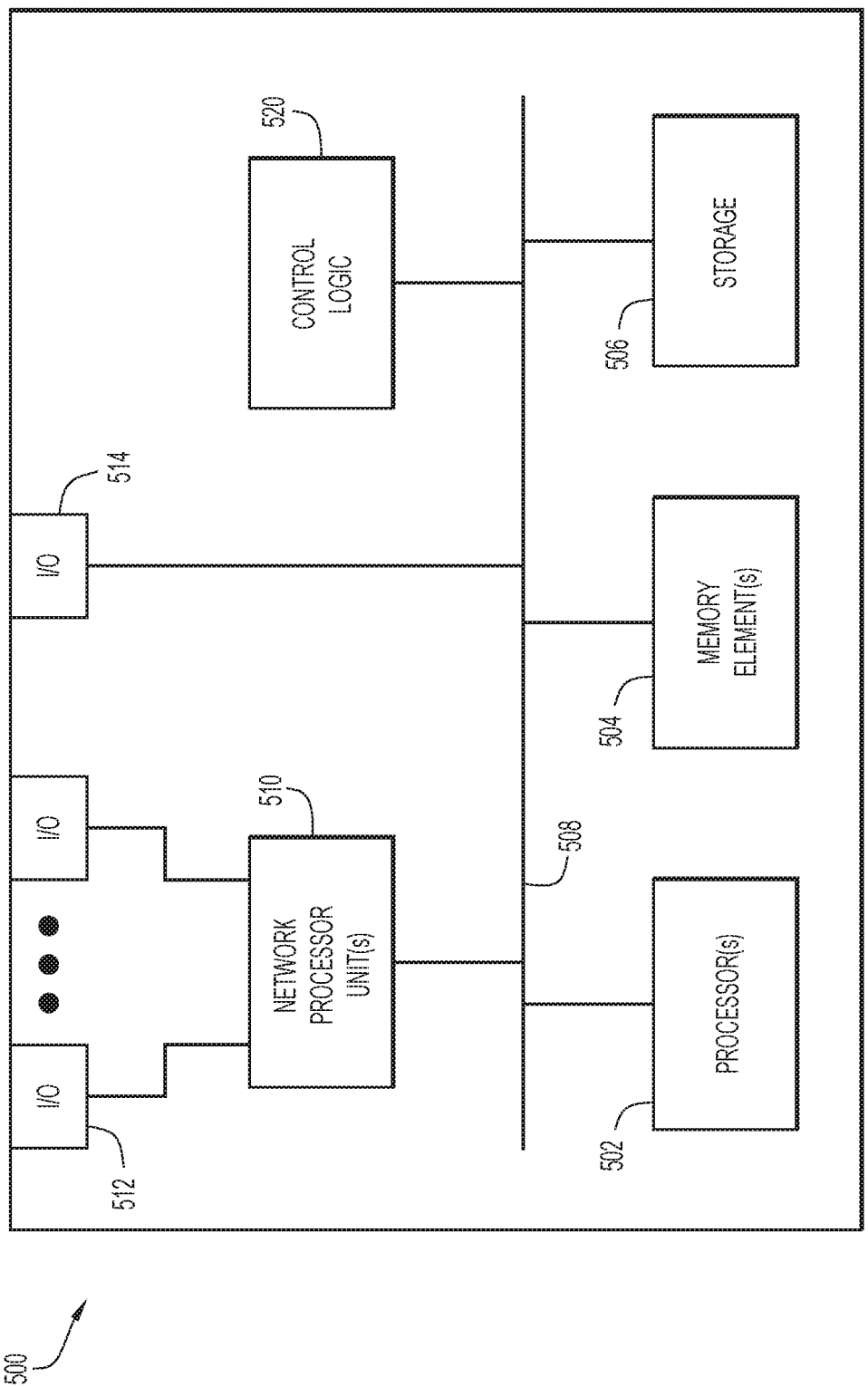
FIG. 5 illustrates a hardware block diagram of a computing device configured to perform the operations presented herein, according to an example embodiment.

Referring to FIG. 5, FIG. 5 illustrates a hardware block diagram of a computing device 500 that may perform functions associated with operations discussed herein in connection with the techniques depicted in FIGS. 1-4. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computer device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

According to an example embodiment, a method includes receiving a natural language input at a natural language processor. The natural language input corresponds to at least one of a desired intent and a desired entity. The method involves scoring, via the natural language processor, known intents based on the natural language input to generate an intent confidence score for each known intent. The method further involves scoring, via the natural language processor, known entities based on the natural language input to generate an entity confidence score for each known entity. The method includes comparing, via the natural language processor, the intent confidence scores and entity confidence scores to a threshold value, and determining that the natural language input does not correspond to at least one of the known intents and the known entities based on the comparing. Finally, the method includes determining at least one of a new intent and a new entity based on the natural language input.

In one form of the method, determining at least one of the new intent and the new entity includes mining historical data for historical use of the natural language input to determine at least one of the new intent and the new entity. The mining historical data may include clustering data points corresponding to historical uses of the natural language input. The method may further involve correlating the natural language input to at least one of the new intent and the new entity based on the clustering.

In one form of the method, the historical data comprises at least one of profile information, calendars, emails, text messages, meeting transcripts, meeting agendas, phone calls, video data, and internet search history.

In one form of the method, determining at least one of the new intent and the new entity includes transmitting a request for a new definition for at least one of the new intent and the new entity, receiving the new definition for at least one of the new intent and new entity, and updating at least one of the known intents and the known entities with at least one of the new intent and new entity.

In one form of the method, the method further includes ranking the known intents based on the scoring, and selecting a highest ranked intent from the known intents based on the ranking. The known entities correspond to the highest ranked intent. Determining at least one of a new intent and a new entity based on the natural language input may include scoring all known entities corresponding to all known intents based on the natural language input, ranking all known entities based on the scoring to generate a highest ranked known entity, updating confidence scores of known intents based on the highest ranked known entity, and comparing the updated confidence scores of the known intents to a second threshold value. In response to at least one of the updated confidence scores of known intents meeting the second threshold value, ranking the known intents based on the updated confidence scores to generate a highest ranked known intent, and determining at least one of the new intent corresponds to the highest ranked known intent, and the new entity corresponds to the highest ranked known entity.

According to another example embodiment, a system includes a non-transitory computer readable storage media and a processor. The processor is configured to receive a natural language input corresponding to at least one of a desired intent and a desired entity, score known intents based on the natural language input to generate an intent confidence score for each known intent, score known entities based on the natural language input to generate an entity confidence score for each known entity, compare the intent confidence scores and entity confidence scores to a threshold value, determine that the natural language input does not correspond to at least one of the known intents and the known entities based on the comparing; and determine at least one of a new intent and a new entity based on the natural language input.

In one form of the system, the processor is further configured to mine historical data for historical use of the natural language input to determine at least one of the new intent and the new entity. The processor may be configured to mine historical data by clustering data points corresponding to historical uses of the natural language input. The processor may be further configured to correlate the natural language input to at least one of the new intent and the new entity based on the clustering.

In one form of the system, the non-transitory computer readable storage media stores the historical data. The historical data includes at least one of profile information, calendars, emails, text messages, meeting transcripts, meeting agendas, phone calls, video data, and internet search history.

In one form of the system, the processor is further configured to transmit a request for a new definition for at least one of the new intent and the new entity, receive the new definition for at least one of the new intent and new entity, and update at least one of the known intents and the known entities with at least one of the new intent and new entity.

According to yet another example embodiment, one or more non-transitory computer readable storage media encoded with instructions that, when executed by a processor, cause the processor to receive a natural language input corresponding to at least one of a desired intent and a desired entity, score known intents based on the natural language input to generate an intent confidence score for each known intent, score known entities based on the natural language input to generate an entity confidence score for each known entity, compare the intent confidence scores and entity confidence scores to a threshold value, determine that the natural language input does not correspond to at least one of the known intents and the known entities based on the comparing, and determine at least one of a new intent and a new entity based on the natural language input.

In one form of the apparatus, the instructions further cause the processor to mine historical data for historical use of the natural language input to determine at least one of the new intent and the new entity. The instructions that cause the processor to mine historical data further comprise instructions for clustering data points corresponding to historical uses of the natural language input. The instructions further cause the processor to correlate the natural language input to at least one of the new intent and the new entity based on the clustering.

In one form of the apparatus, the non-transitory computer readable media include historical data. The historical data includes at least one of profile information, calendars, emails, text messages, meeting transcripts, meeting agendas, phone calls, video data, and internet search history.

In one form of the apparatus, the instructions further cause the processor to transmit a request for a new definition for at least one of the new intent and the new entity, receive the new definition for at least one of the new intent and new entity, and update at least one of the known intents and the known entities with at least one of the new intent and new entity.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method for training a virtual assistant to recognize and learn a new context for known terms, the method comprising:
    receiving a natural language input at a natural language processor, the natural language input corresponding to at least one of a desired intent and a desired entity;
    determining, via the natural language processor, a domain of known intents and known entities based on the natural language input and a natural language understanding (NLU) model;
    scoring, via the natural language processor, known intents corresponding to the domain based on the natural language input and the NLU model to generate an intent confidence score for each known intent;
    scoring, via the natural language processor, known entities corresponding to the domain based on the natural language input to generate an entity confidence score for each known entity;
    comparing, via the natural language processor, the intent confidence scores and entity confidence scores to a threshold value;
    determining, via the natural language processor, that the natural language input is the same as or similar to terms corresponding to the known intents and the known entities, and the known intents do not correspond to the known entities based on the comparing;
    retraining the NLU model, via the natural language processor, by mining historical data for historical use of the natural language input to generate an updated NLU model, the retraining comprising:
        scoring all known entities corresponding to all known intents of all known domains based on the natural language input;

ranking all known entities based on the scoring to generate a highest ranked known entity;
updating confidence scores of known intents based on the highest ranked known entity;
comparing the updated confidence scores of the known intents to a second threshold value; and
in response to at least one of the updated confidence scores of known intents meeting the second threshold value:
ranking the known intents based on the updated confidence scores to generate a highest ranked known intent;
determining at least one of:
a new intent corresponds to the highest ranked known intent, and
a new entity corresponds to the highest ranked known entity; and
updating the domain with at least one of the new intent and the new entity; and
determining the natural language input corresponds to at least one of the new intent and the new entity based on the updated NLU model.

2. The method of claim 1, wherein the mining historical data further comprising clustering data points corresponding to historical uses of the natural language input.

3. The method of claim 2, further comprising correlating the natural language input to at least one of the new intent and the new entity based on the clustering.

4. The method of claim 1, wherein the historical data comprises at least one of profile information; calendars; emails; text messages; meeting transcripts; meeting agendas; phone calls; video data; and internet search history.

5. The method of claim 1, wherein determining at least one of the new intent and the new entity comprises:
transmitting a request for a new definition for at least one of the new intent and the new entity;
receiving the new definition for at least one of the new intent and new entity; and
updating at least one of the known intents and the known entities with at least one of the new intent and new entity.

6. The method of claim 1, further comprising:
ranking the known intents based on the scoring; and
selecting a highest ranked intent from the known intents based on the ranking,
wherein, the known entities correspond to the highest ranked intent.

7. The method of claim 1, wherein determining at least one of the new intent and the new entity comprises adding at least one of the new intent and the new entity to the domain.

8. The method of claim 1, wherein at least one of the new intent and the new entity comprises a known intent and/or a known entity from another domain.

9. A system comprising:
a non-transitory computer readable storage media; and
a processor configured to:
receive a natural language input corresponding to at least one of a desired intent and a desired entity;
determine, via the natural language processor, a domain of known intents and known entities based on the natural language input and a natural language understanding (NLU) model;
score known intents corresponding to the domain based on the natural language input and the NLU model to generate an intent confidence score for each known intent;
score known entities corresponding to the domain based on the natural language input to generate an entity confidence score for each known entity;
compare the intent confidence scores and entity confidence scores to a threshold value;
determine that the natural language input is the same as or similar to terms corresponding to the known intents and the known entities, and the known intents do not correspond to the known entities based on the comparing;
retrain the NLU model, via the natural language processor, by mining historical data for historical use of the natural language input to generate an updated NLU model, and comprising:
scoring all known entities corresponding to all known intents of all known domains based on the natural language input;
ranking all known entities based on the scoring to generate a highest ranked known entity;
updating confidence scores of known intents based on the highest ranked known entity;
comparing the updated confidence scores of the known intents to a second threshold value; and
in response to at least one of the updated confidence scores of known intents meeting the second threshold value:
ranking the known intents based on the updated confidence scores to generate a highest ranked known intent;
determining at least one of:
a new intent corresponds to the highest ranked known intent, and
a new entity corresponds to the highest ranked known entity; and
updating the domain with at least one of the new intent and the new entity; and
determine the natural language input corresponds to at least one of the new intent and the new entity based on the updated NLU model.

10. The system of claim 9, wherein the processor is further configured to mine historical data by clustering data points corresponding to historical uses of the natural language input.

11. The system of claim 10, wherein the processor is further configured to correlate the natural language input to at least one of the new intent and the new entity based on the clustering.

12. The system of claim 9, wherein the non-transitory computer readable storage media stores the historical data, the historical data comprising at least one of profile information; calendars; emails; text messages; meeting transcripts; meeting agendas; phone calls; video data; and internet search history.

13. The system of claim 9, wherein the processor is further configured to:
transmit a request for a new definition for at least one of the new intent and the new entity;
receive the new definition for at least one of the new intent and new entity; and
update at least one of the known intents and the known entities with at least one of the new intent and new entity.

14. The system of claim 9, wherein at least one of the new intent and the new entity comprises a known intent and/or a known entity from another domain.

15. One or more non-transitory computer readable storage media encoded with instructions that, when executed by a processor, cause the processor to:
- receive a natural language input corresponding to at least one of a desired intent and a desired entity;
- determine, via the natural language processor, a domain of known intents and known entities based on the natural language input and a natural language understanding (NLU) model;
- score known intents corresponding to the domain based on the natural language input and the NLU model to generate an intent confidence score for each known intent;
- score known entities corresponding to the domain based on the natural language input to generate an entity confidence score for each known entity;
- compare the intent confidence scores and entity confidence scores to a threshold value;
- determine that the natural language input is the same as or similar to terms corresponding to the known intents and the known entities, and the known intents do not correspond to the known entities based on the comparing;
- retrain the NLU model, via the natural language processor, by mining historical data for historical use of the natural language input to generate an updated NLU model, the retraining comprising:
  - scoring all known entities corresponding to all known intents of all known domains based on the natural language input;
  - ranking all known entities based on the scoring to generate a highest ranked known entity;
  - updating confidence scores of known intents based on the highest ranked known entity;
  - comparing the updated confidence scores of the known intents to a second threshold value; and
  - in response to at least one of the updated confidence scores of known intents meeting the second threshold value:
    - ranking the known intents based on the updated confidence scores to generate a highest ranked known intent;
    - determining at least one of:
      - a new intent corresponds to the highest ranked known intent, and
      - a new entity corresponds to the highest ranked known entity; and
    - updating the domain with at least one of the new intent and the new entity; and
- determine the natural language input corresponds to at least one of the new intent and the new entity based on the updated NLU model.

16. The one or more non-transitory computer readable storage media of claim 15, wherein the instructions that cause the processor to mine historical data further comprise instructions for clustering data points corresponding to historical uses of the natural language input.

17. The one or more non-transitory computer readable storage media of claim 16, wherein the instructions further cause the processor to correlate the natural language input to at least one of the new intent and the new entity based on the clustering.

18. The one or more non-transitory computer readable storage media of claim 15, further comprising the historical data, the historical data comprising at least one of profile information; calendars; emails; text messages; meeting transcripts; meeting agendas; phone calls; video data; and internet search history.

19. The one or more non-transitory computer readable storage media of claim 15, wherein the instructions further cause the processor to:
- transmit a request for a new definition for at least one of the new intent and the new entity;
- receive the new definition for at least one of the new intent and new entity; and
- update at least one of the known intents and the known entities with at least one of the new intent and new entity.

20. The one or more non-transitory computer readable storage media of claim 15, wherein at least one of the new intent and the new entity comprises a known intent and/or a known entity from another domain.

* * * * *